United States Patent
Osborne

(10) Patent No.: US 9,562,418 B2
(45) Date of Patent: Feb. 7, 2017

(54) VALVE WITH SHUTTLE

(76) Inventor: Lawrence Osborne, Acton, CA (US)

( * ) Notice: Subject to any disclaimer, the term of this patent is extended or adjusted under 35 U.S.C. 154(b) by 1244 days.

(21) Appl. No.: 13/446,195

(22) Filed: Apr. 13, 2012

(65) Prior Publication Data
US 2012/0199210 A1    Aug. 9, 2012

Related U.S. Application Data

(63) Continuation-in-part of application No. 13/089,312, filed on Apr. 19, 2011, now Pat. No. 8,955,601, which is a continuation-in-part of application No. 12/766,141, filed on Apr. 23, 2010, now Pat. No. 8,545,190.

(60) Provisional application No. 61/611,543, filed on Mar. 15, 2012.

(51) Int. Cl.
| | | |
|---|---|---|
| E21B 34/00 | (2006.01) | |
| E21B 34/08 | (2006.01) | |
| E21B 43/12 | (2006.01) | |
| F04B 47/00 | (2006.01) | |
| F16K 17/26 | (2006.01) | |

(52) U.S. Cl.
CPC ............. *E21B 34/08* (2013.01); *E21B 43/126* (2013.01); *F04B 47/00* (2013.01); *F16K 17/26* (2013.01); *E21B 2034/005* (2013.01); *Y10T 137/0318* (2015.04); *Y10T 137/7854* (2015.04); *Y10T 137/87788* (2015.04)

(58) Field of Classification Search
CPC ........ E21B 34/06; E21B 34/08; E21B 43/126; E21B 2034/005; Y10T 137/7854; Y10T 137/87788; F16K 17/26

USPC .................................................. 137/107, 155
See application file for complete search history.

(56) References Cited

U.S. PATENT DOCUMENTS

| | | | |
|---|---|---|---|
| 3,027,907 A | | 4/1962 | Lee |
| 3,208,472 A | * | 9/1965 | Scaramucci .......... F16K 15/038 137/454.2 |
| 4,057,074 A | | 11/1977 | Fischer |
| 4,100,969 A | * | 7/1978 | Randermann, Jr. ..... E21B 34/12 137/629 |
| 4,248,264 A | * | 2/1981 | Hadsell ................. E21B 21/106 137/454.2 |
| 4,260,020 A | * | 4/1981 | Nelson .................... E21B 25/00 166/305.1 |
| 4,291,722 A | * | 9/1981 | Churchman ............ E21B 21/10 137/496 |
| 5,439,022 A | | 8/1995 | Summers et al. |
| 5,636,661 A | * | 6/1997 | Moyes .................... E21B 34/06 137/496 |
| 6,289,990 B1 | * | 9/2001 | Dillon .................... F16K 17/19 166/319 |
| 2002/0174988 A1 | * | 11/2002 | Szarka .................. E21B 21/103 166/325 |

FOREIGN PATENT DOCUMENTS

| | | |
|---|---|---|
| RU | 2150575 C1 | 10/2000 |
| RU | 34623 U1 | 10/2003 |

* cited by examiner

*Primary Examiner* — Mary McManmon
*Assistant Examiner* — Richard K Durden
(74) *Attorney, Agent, or Firm* — Paul D. Chancellor; Ocean Law

(57) ABSTRACT

A valve with a shuttle for use in a flow management system includes a spill port and bypasses a backflow.

34 Claims, 11 Drawing Sheets

VALVE WITH SHUTTLE

PRIORITY CLAIM

This application is a continuation in part of U.S. patent application Ser. No. 13/089,312 filed Apr. 19, 2011 now U.S. Pat. No. 8,955,601 which is a continuation in part of U.S. patent application Ser. No. 12/766,141 filed Apr. 23, 2010 now U.S. Pat. No. 8,545,190. Both of these applications are incorporated herein in their entireties and for all purposes.

This application claims the benefit of Provisional Patent Application No. 61/611,543 filed Mar. 15, 2012 which is incorporated herein in its entirety and for all purposes.

BACKGROUND OF THE INVENTION

Field of the Invention

The present invention relates to fluid flow components and systems using those components. In particular, the present invention relates to an improved valve with shuttle for use in fluid flow systems.

Discussion of the Related Art

Pumps and valves located in hard to reach places present maintenance and maintenance downtime issues. Where pumps and valves are used to produce a natural resource such as a hydrocarbon, downtime can result in lost production and increased expenses for workmen and materials.

In particular, downhole production strings including pumps and valves for lifting fluids such as particulate laden liquids and slurries present a maintenance problem. Here, both pumps and valves can lose capacity and in cases be rendered inoperative when conditions including fluid conditions and fluid velocities fall outside an intended operating range. Such unintended operating conditions can foul, plug, and damage equipment.

Despite the industry's resistance to change, there remains a need to improve production strings.

SUMMARY OF THE INVENTION

The present invention includes a valve with a shuttle that is useful in flow management systems. In an embodiment, the valve for use in a flow management system comprises: a valve body with a spill port, the valve body having a valve body centerline extending between opposed ends of the valve; a shuttle including a lid carrier and a lid; the lid carrier having a lid end and the lid rotatably coupled to the lid carrier near the lid end; the lid carrier located in a chamber of the valve body; the lid carrier having a through hole extending between a lid carrier spring end and the lid carrier lid end; a first seat and a first closure located at a lid carrier mouth of the lid carrier lid end; a first seal limiting flow between the lid and the lid carrier, the first seal operable to utilize the first seat; a second seal limiting flow between the valve body and the lid carrier, the second seal operable to utilize the first closure; a third seal limiting flow between the valve body and the lid carrier, the third seal operable to utilize a valve body bore; a spring located between the lid carrier spring end and a spring base supported by the valve body; and, the valve operable to pass a flow entering the through hole at the lid carrier spring end and to spill a flow that closes the articulated lid against the lid carrier.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed invention.

To the extent parts, components and functions of the described invention exchange fluids, the associated interconnections and couplings may be direct or indirect unless explicitly described as being limited to one or the other. Notably, indirectly connected parts, components and functions may have interposed devices and/or functions known to persons of ordinary skill in the art.

Figures 1, 2:
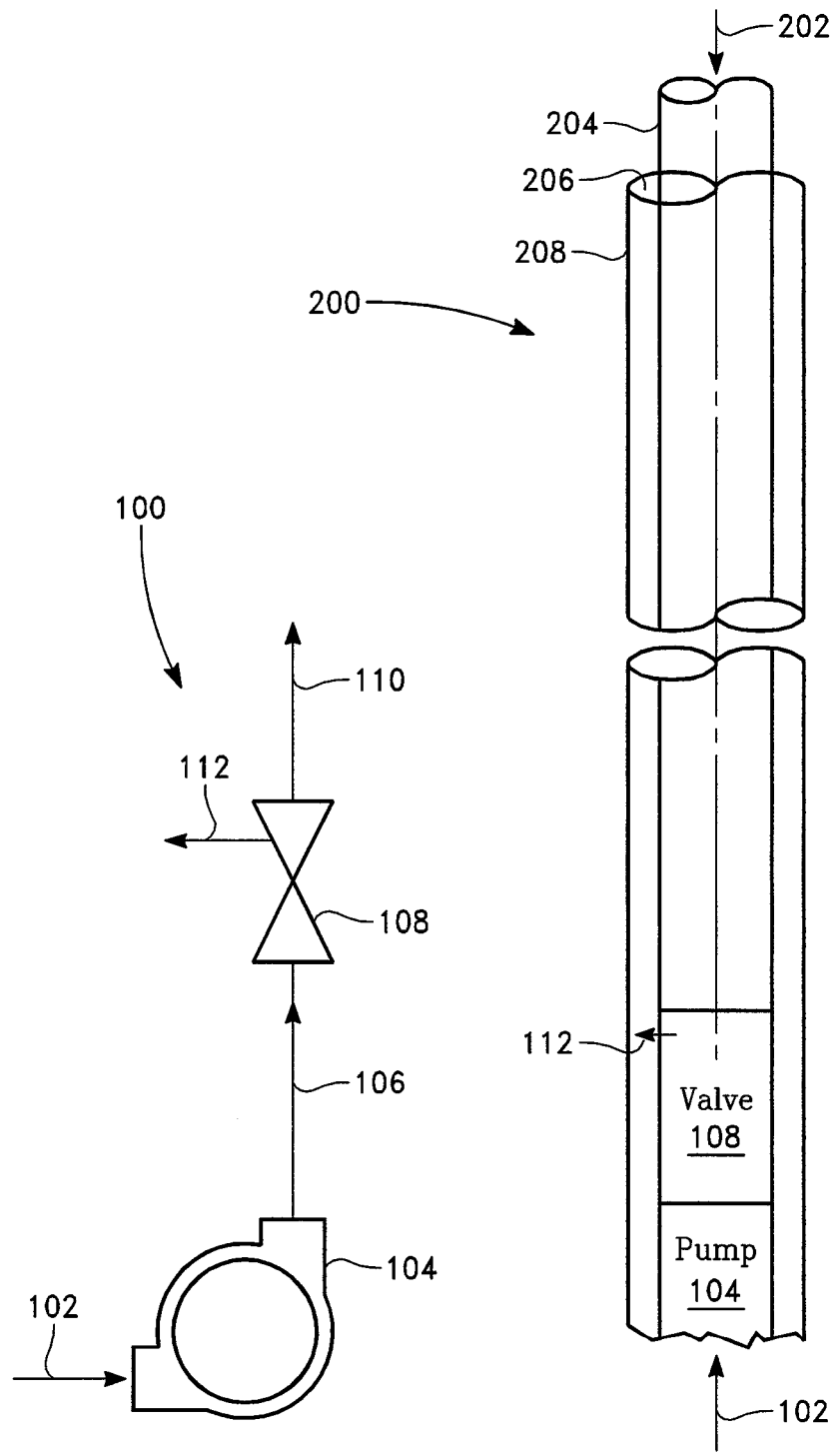
FIG. 1 is a schematic diagram of a valve in a flow management system in accordance with the present invention.
FIG. 2 is a diagram of the flow management system of FIG. 1.

FIG. 1 shows an embodiment of the invention 100 in the form of a schematic diagram. A bypass valve 108 is interconnected with a pump 104 via a pump outlet 106. The pump includes a pump inlet 102 and the valve includes a valve outlet 110 and a valve spill port 112. In various embodiments, the inlets, outlets and ports are one or more of a fitting, flange, pipe, or similar fluid conveyance.

FIG. 2 shows a section of a typical downhole production string 200. The production string includes the bypass valve 108 interposed between the pump 104 and an upper tubing string 204. In some embodiments, a casing 208 surrounds one or more of the tubing string, valve, and pump. Here, an annulus 206 is formed between the tubing string and the casing. A production flow is indicated by an arrow 102 while a backflow is indicated by an arrow 202. In various embodiments, the bypass valve serves to isolate backflows from one or more of the valve, portions of the valve, and the pump.

Figure 3A:
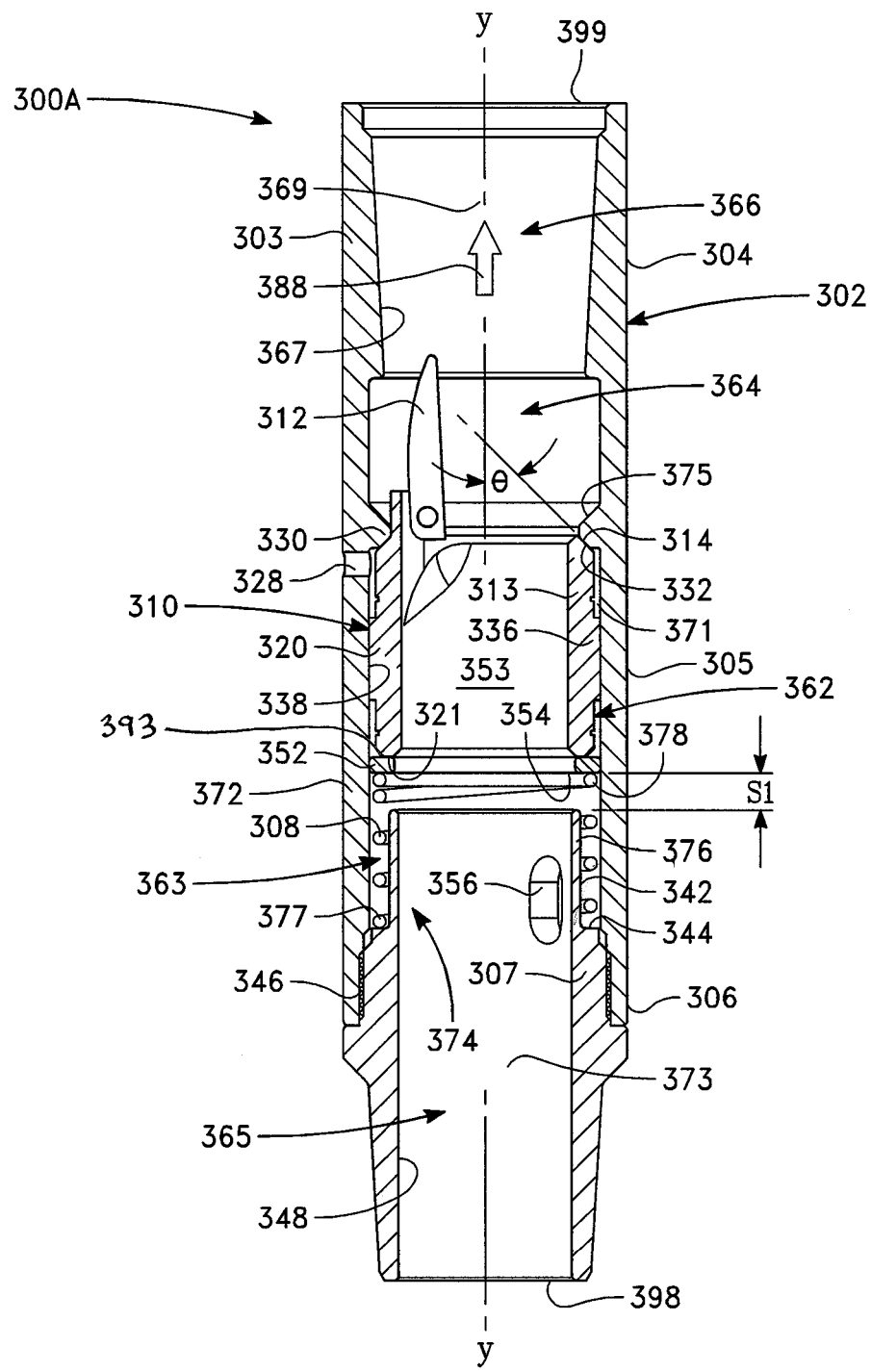
FIG. 3A is a cross-sectional view of an open valve of the flow management system of FIG. 1.

FIG. 3A shows a first bypass valve in a lid open configuration 300A. A valve body 302 includes an upper body 304, a middle body 305, and a lower body 306.

The upper body includes a first through hole 369. In some embodiments, the first through hole passes through an outlet chamber 366 of an upper adapter 303 and through a lid chamber 364. In some embodiments, an inner surface of the adapter 367 is threaded.

The middle body includes a second through hole 371. In some embodiments the second through hole passes through a shuttle chamber 362 proximate the lid chamber 364. The lower body includes a third through hole 373. In some embodiments, the third through hole passes through an inlet chamber 365 such that the shuttle chamber is located between the lid chamber and the inlet chamber.

Within the lower body 306, a spring shoulder such as an annular spring shoulder 344 for supporting a charge spring 308 projects inwardly from a first inner bore of the lower body 372. In some embodiments, the shoulder extends between the first inner bore of the lower body and a cylindrical spring guide 342.

And, in some embodiments, the shoulder 344 and the springe guide 342 are portions of a lower adapter 307 forming at least part of the lower body 306. In some embodiments, an inside surface of the adapter is threaded 348. Here, an upper end of the adapter 374 has a reduced outer diameter 376 such that the spring shoulder is formed where the diameter is reduced and the spring guide is formed along the length of the reduced diameter portion of the adapter. As shown, a portion of the charge spring is located in an annular pocket 363 between the first inner bore of the lower body 372 and the spring guide. In some embodiments, the lower adapter and lower body are fixed together via screw threads 346.

The port shown in the spring guide 356 provides a means for flushing the annular pocket 363 in some embodiments. As seen, the port extends between the lower chamber 365 and the annular pocket 363. Action of the spring and/or pressure differentials between the pocket and the lower chamber provide a flushing action operative to remove solids such as sand that may otherwise tend to accumulate in the annular pocket.

Within the middle body 305 a middle body bore 338 is for receiving a valve shuttle 310. The charge spring 308 is for urging the shuttle toward the valve outlet end 399. This shuttle urging may be via direct or indirect charge spring contact. For example, embodiments utilize direct contact between a shuttle carrier lower end 321 and an upper end of the charge spring 378. Other embodiments utilize indirect contact such as via an annular transition ring 352 having an upper face 393 contacting the shuttle carrier lower end and a lower face 354 contacting a charge spring upper end (as shown).

At a lower end of the upper body 375, an inwardly projecting nose 330 includes a stationery seat 332 for engaging a closure 314 encircling a lid carrier upper end 313. For example, in various embodiments the seat and closure are configured to meet along a line forming an angle θ<90 degrees with respect to a valve centerline y-y. Absent greater opposing forces, the charge spring 308 therefore moves the shuttle 310 until the shuttle closure 314 is stopped against the stationery seat 332.

Figure 3B:
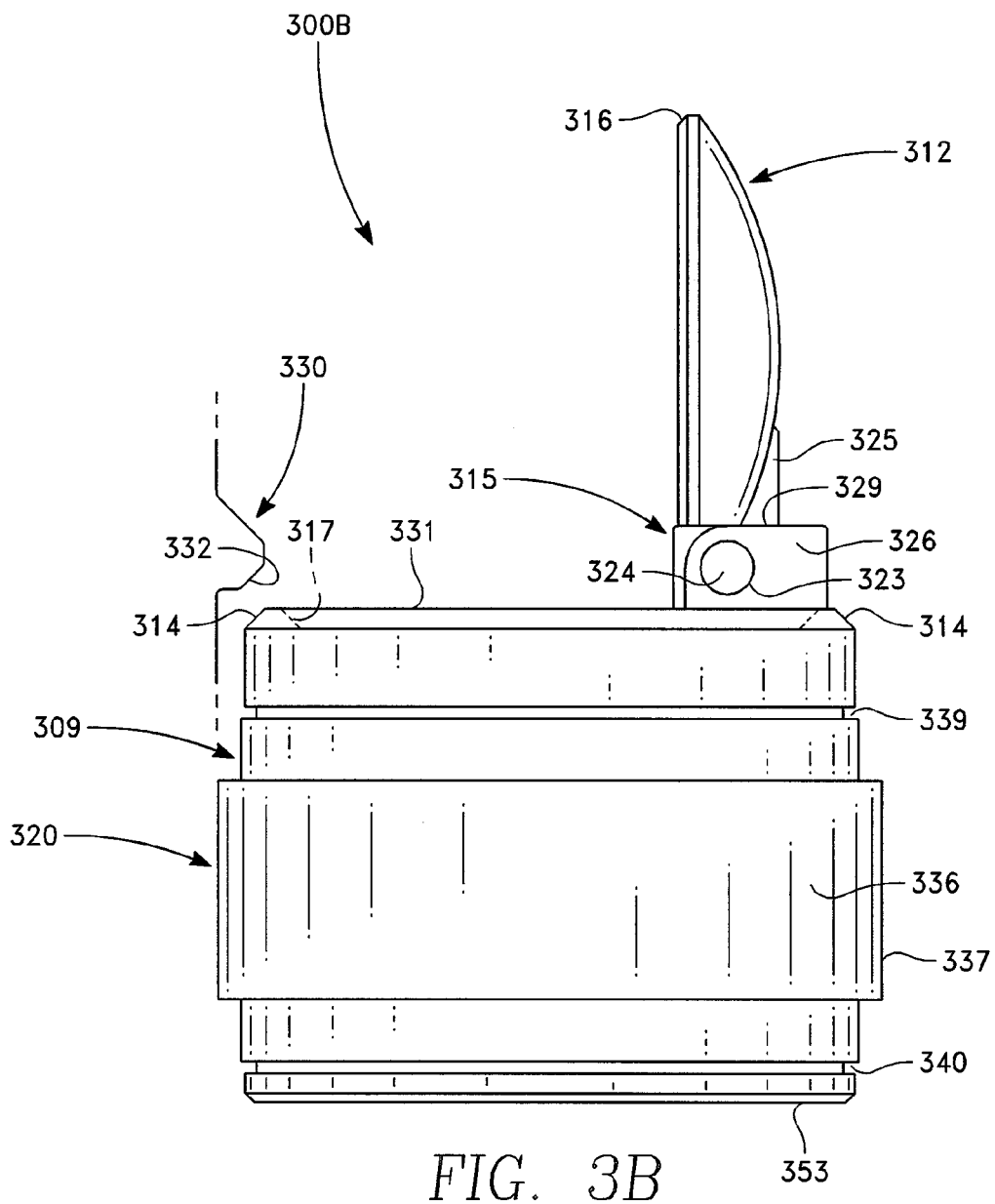
FIG. 3B is a side view of an open shuttle of the valve of the flow management system of FIG. 1.

FIG. 3B shows a lid open embodiment 300B of the valve shuttle of FIG. 3A. An articulated lid 312 is coupled to a lid carrier 320. In various embodiments, a lid pivot 315 includes a pivot block 326 adapted to be movably coupled to a lid boss 325, for example, an engagement via a pinned connection including a hole in the pivot block 323, a hole in the lid boss 329, and a lid pin 324 for interengaging the holes.

In various embodiments, the lid carrier 320 has one or more distinct circumferential surfaces 309 (several shown). In an embodiment a shuttle girth boss 336 defines a circumferential boss surface 337 for aligning the shuttle carrier in the middle body bore 338. And, in some embodiments, one or more circumferential seals provide a seal between the lid carrier and the middle body bore. For example, in some embodiments grooves in the lid carrier circumference 339, 340 provide means for engaging seals such as groove engaging seals, O-rings and other seals including seals formed from synthetic materials such as Teflon, Viton, PEEK, silicone, and other suitable materials known to skilled artisans. In an embodiment, the groves provide a means for engaging cylindrical seals such as PEEK seals with a thickness sufficient to substantially close the gap between the grooves and the middle body bore. See for example the circumferential groove engaging seal 379 of FIG. 3D. In various embodiments, one or more of the lid carrier girth boss and seal(s) such as seal(s) associated with the grooves provide a first lid carrier to valve body seal.

The articulated lid 312 provides a means for blocking a lid carrier through hole 353. In particular, a lid carrier mouth 331 has an internal seat 317 for mating with a closure of the articulated lid 316. This lid closure is free to move in response to lid articulation with respect to the lid carrier, carrier translation with respect to the valve body 302, and carrier rotation with respect to the valve body. Similarly, the lid carrier internal seat 317 is free to move in response to both translation and rotation of the lid carrier with respect to the valve body. As seen here, various embodiments provide a lid to lid carrier seal.

Mentioned above, the lid carrier includes an external closure 314. This closure is near the lid carrier mouth 331 and is for mating with the stationery seat within the valve body 332. As seen here, various embodiments provide a second lid carrier to valve body seal.

Turning now to the spill port 328 shown in FIG. 3A, it can be seen that the first lid carrier to valve body seal provides a seal below the port while the second lid carrier to valve body provides a seal located above the port. Therefore, when the shuttle 310 is stopped against the inwardly projecting nose 330, these seals isolate the spill port from the inlet and outlet chambers 365, 366 such that the spill port is blocked. In some embodiments, a circumferential lid carrier seal (see for example seal 379 of FIG. 3D) fitted to the upper seal engagement 339 blocks the spill port when the shuttle is stopped against the inwardly projecting nose 330.

Figure 3C:
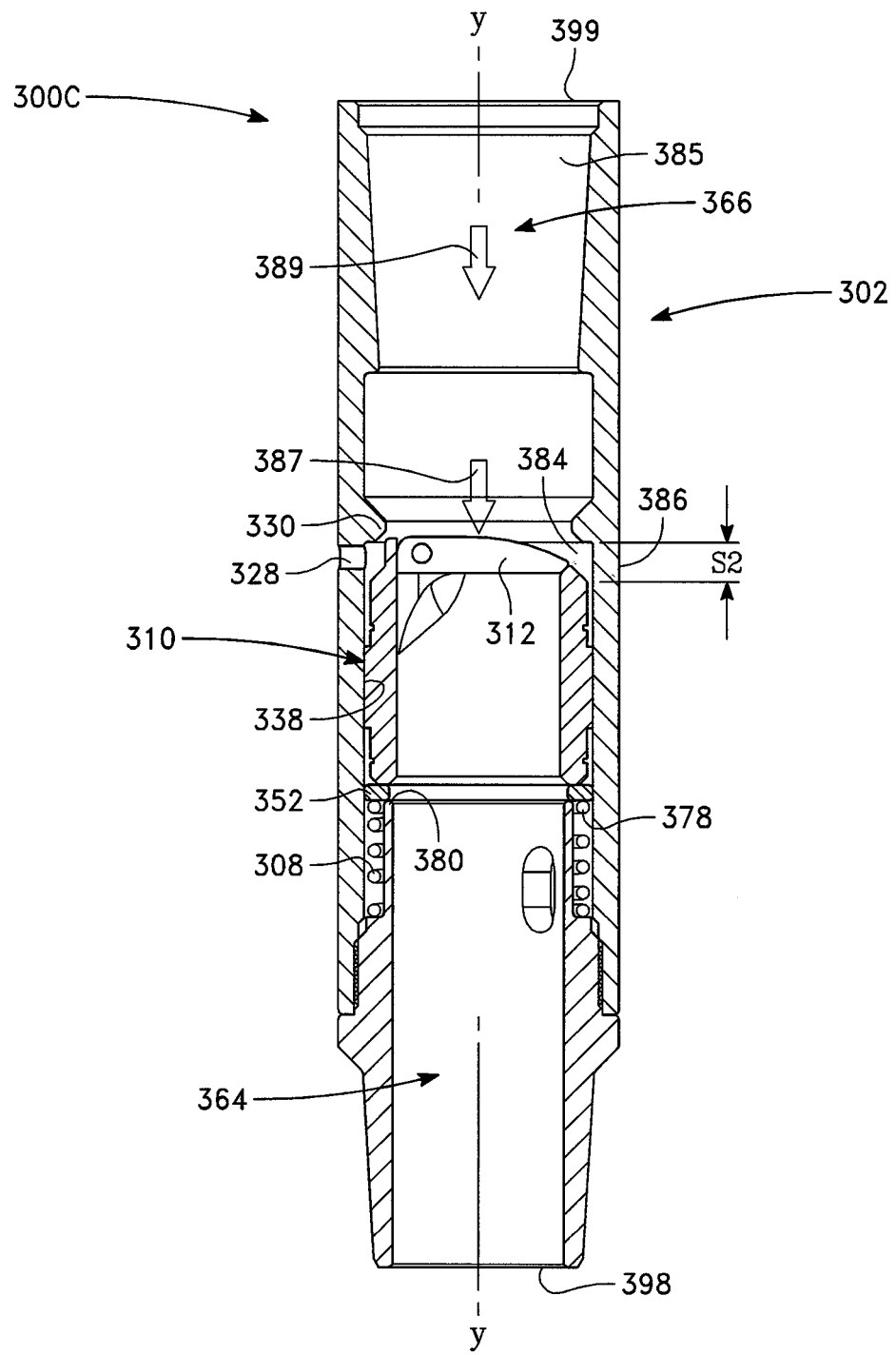
FIG. 3C is a cross-sectional view of a closed valve of the flow management system of FIG. 1.

FIG. 3C shows the first bypass valve in a spill port unblocked configuration 300C. Here, the shuttle 310 is moved toward the inlet end 398 by a distance "S2," a shuttle stroke sufficient to unblock the spill port 328. In this configuration, flow entering the outlet chamber 389 can move through a spill pocket 384 with boundaries including the middle body bore 338 and the shuttle 310 before exiting the valve body 302 via one or more spill ports 328. In some embodiments, the illustrated spill port is one of six spill ports arranged around a valve body periphery 386.

Figure 3D:
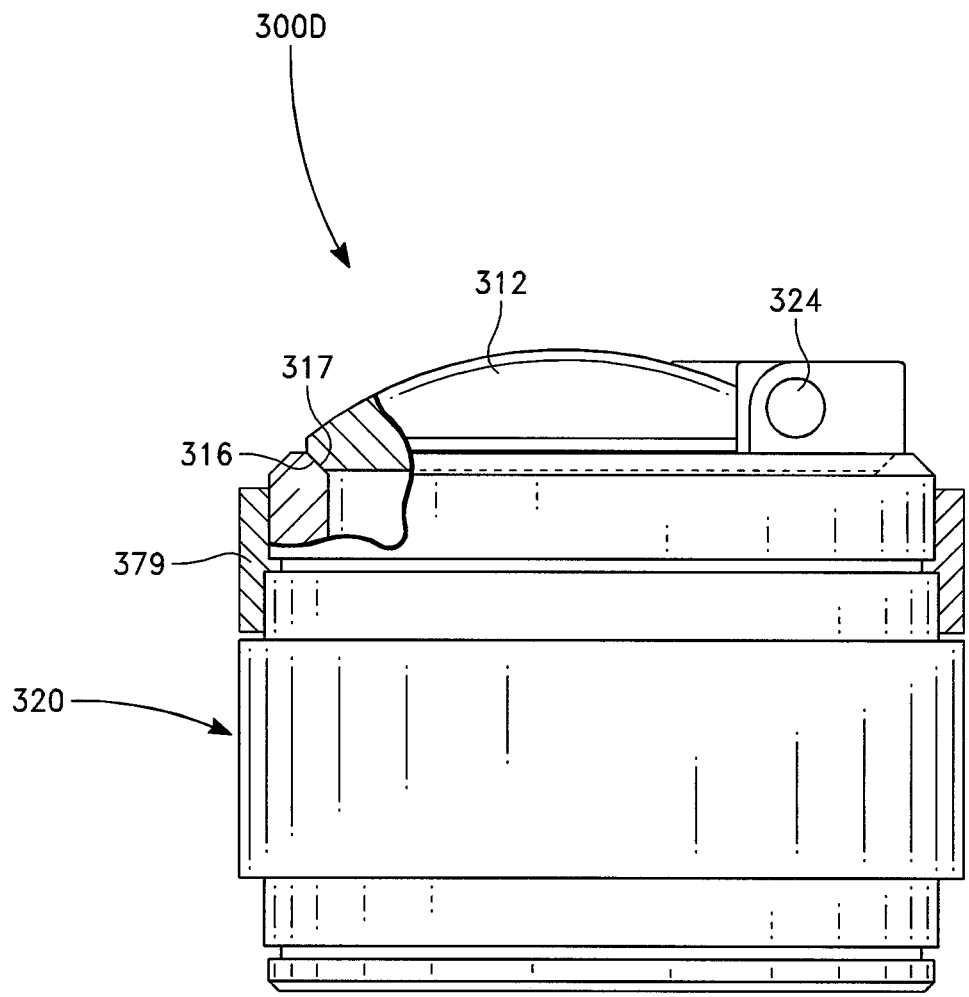
FIG. 3D is a side view of a closed shuttle of the valve of the flow management system of FIG. 1.

FIG. 3D shows an embodiment 300D of the valve shuttle of FIG. 3C. As shown, the articulated lid 312 is closed such that there is a lid to lid carrier seal formed between the lid carrier mouth internal seat 317 and the lid closure 316.

FIGS. 3A and 3C therefore illustrate two operating configurations of the first bypass valve 300A, 300C. In the lid open configuration of FIG. 3A, the valve is flowing a fluid 388 under normal operating conditions. This normal flow condition, from the valve inlet end 398 to the valve outlet end 399, will be referred to as forward flow.

As shown in FIG. 3A, forward flow lifts the articulated lid 312 such that it extends into the lid clearance chamber 364. In various embodiments, forward flow fluid dynamic drag acts on the lid to overcome gravity and to lift the lid away from the lid carrier. And, in some embodiments forward flow fluid dynamic drag acts on the lid and overcomes one or both of gravity and a spring acting to hold the lid closed. Suitable spring arrangements include torsional springs, springs encircling a lid pinned connection, tension springs extending between the lid and a relative fixed point, and the like.

Inadequate forward flow such as reverse flow causes the articulated lid 312 to close against the lid carrier 320. When the lid is closed, forward flow is substantially limited or, but for leakage such as unintended leakage, is stopped. To the extent that the fluid head above the lid 385 (see also FIGS. 1 and 2) results in a fluid head force on the valve shuttle 387 adequate to compress the charge spring 308, the shuttle 310 moves toward the inlet end of the valve 398. The shuttle diameter, approximated in various embodiments as the middle body bore diameter 338, provides an estimate of the area acted on by the fluid head and thus the fluid head force. Skilled artisans will determine one or more valve variables including a spring constant "k" ($F=k*x$) of the charge spring to adapt the valve for particular applications.

The head of fluid above the lid 385 can be spilled from the valve body 302 via the spill port 328. This spilling occurs when the shuttle 310 compresses the charge spring 308 as shown in FIG. 3C. In various embodiments, spilling occurs when the second lid carrier to valve body seal is opened. And, in various embodiments spilling occurs when the second lid carrier to valve body seal is opened and any spill port blocking seal carried by the shuttle, such as the first lid carrier to valve body seal is moved away from the spill port.

As shown in FIG. 3C, the spill port is fully open when the shuttle stroke dimension is "S2." In some embodiments, this shuttle stroke is limited by interference between the transition ring 352 and the spring guide upper end 380 (see S1 of FIG. 3A).

Forward flow in the valve is typically be re-established through operation of the pump 104 (see FIGS. 1 and 2). In various embodiments, sufficient pump pressure forces a) open the articulated lid 312, b) substantially remove the head force 387 from the shuttle 310, and c) allow the charge spring 308 to expand and push the shuttle against the valve inwardly projecting nose 330. In various embodiments, pump pressure forces sufficient to open the lid depend substantially upon fluid head 385.

In various embodiments, adjustments affecting forces applied to the shuttle bias shuttle position. For example, when the articulated lid 312 is open, significant forces acting on the shuttle 301 are the charge spring 308 force and the substantially equal but opposite force applied by the inwardly projecting nose 330. However, when the lid is closed, the major valve shuttle forces are the charge spring force and the pump force (Pump Pressure*AP2) balanced against the head force (Head Pressure*AP1).

Figure 4A:
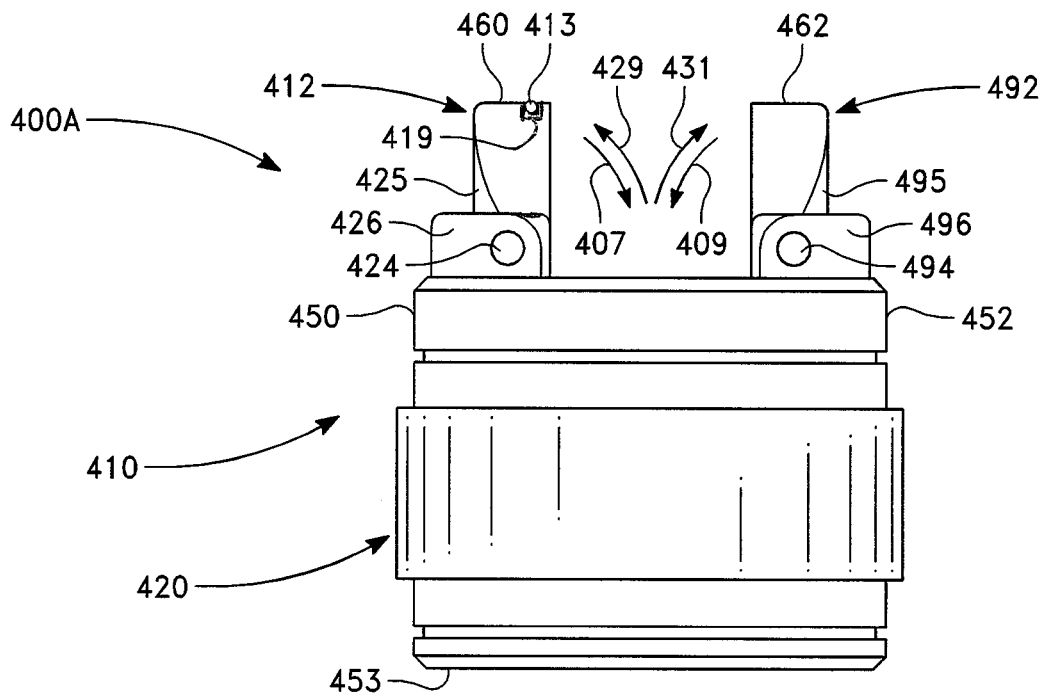
FIG. 4A is a side view of a second shuttle of the valve of the flow management system of FIG. 1.
Figure 4B:
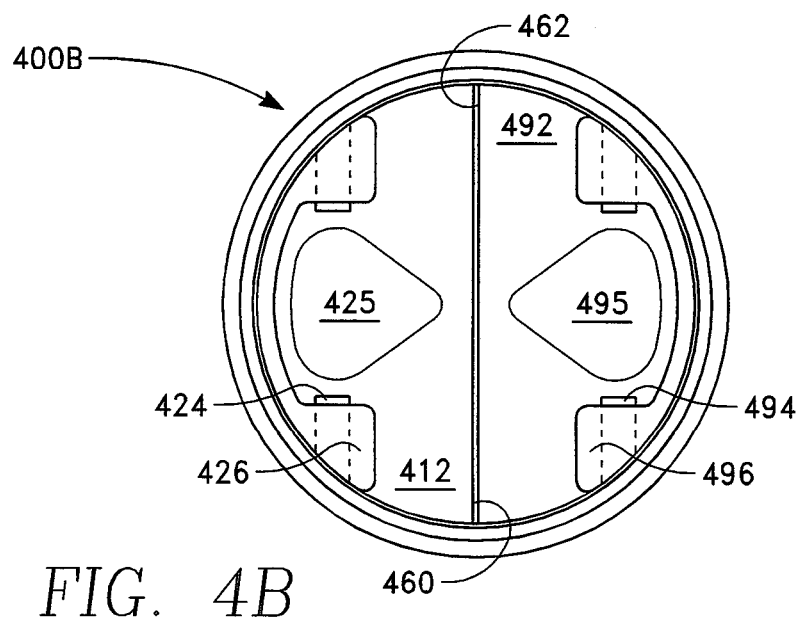
FIG. 4B is a top view of the shuttle of FIG. 4A.

FIGS. 4A and 4B show side and top views of a shuttle with a multi-part lid 400A, 400B. In particular, a shuttle 410 includes a lid carrier 420 and first and second articulated lids 412, 492.

Coupled at one side of the lid carrier 450, the first lid 412 has a first lid boss 425 which is pivotally coupled via a first pin 424 with a first pivot block of the lid carrier 426. Coupled at an opposed second side of the lid carrier 452, the second lid 492 has a second lid boss 495 which is pivotally coupled via a second pin 494 with a second pivot block of the lid carrier 496.

In operation, the articulated lids 412, 492 are responsive to forward and reverse flows as described above. In particular, a forward flow tends to open the lids 429, 431 allowing fluid to flow through a shuttle through hole 453 while a reverse flow tends to close the lids 407, 409.

Sealing between the front faces of the articulated lids 460, 462 may merely be a narrow gap, if any, or a seal may be employed. In some embodiments, a seal is attached to one or both faces and is engaged with an opposing face when the lids are closed 407, 409. For example, a feature such as a groove 419 of a front face 460 provides a coupling for a seal. As shown, a seal 413 is located in the groove. In various embodiments, the seal is made from an elastomeric material and has a suitable cross-section such as a circular cross-section (as shown) or a rectangular cross-section.

In some production strings using pumps and valves, such as the production string of FIG. 2, the pump 104 used will be a rod driven pump including a rotatable rod passing through a valve body and engaging a pump shaft for operating the pump. Embodiments of the present invention provide solutions for these rod driven pump applications. In particular, FIGS. 5, 6A, and 6B below illustrate shuttles through which a pump driving rod can be passed.

Figure 5:
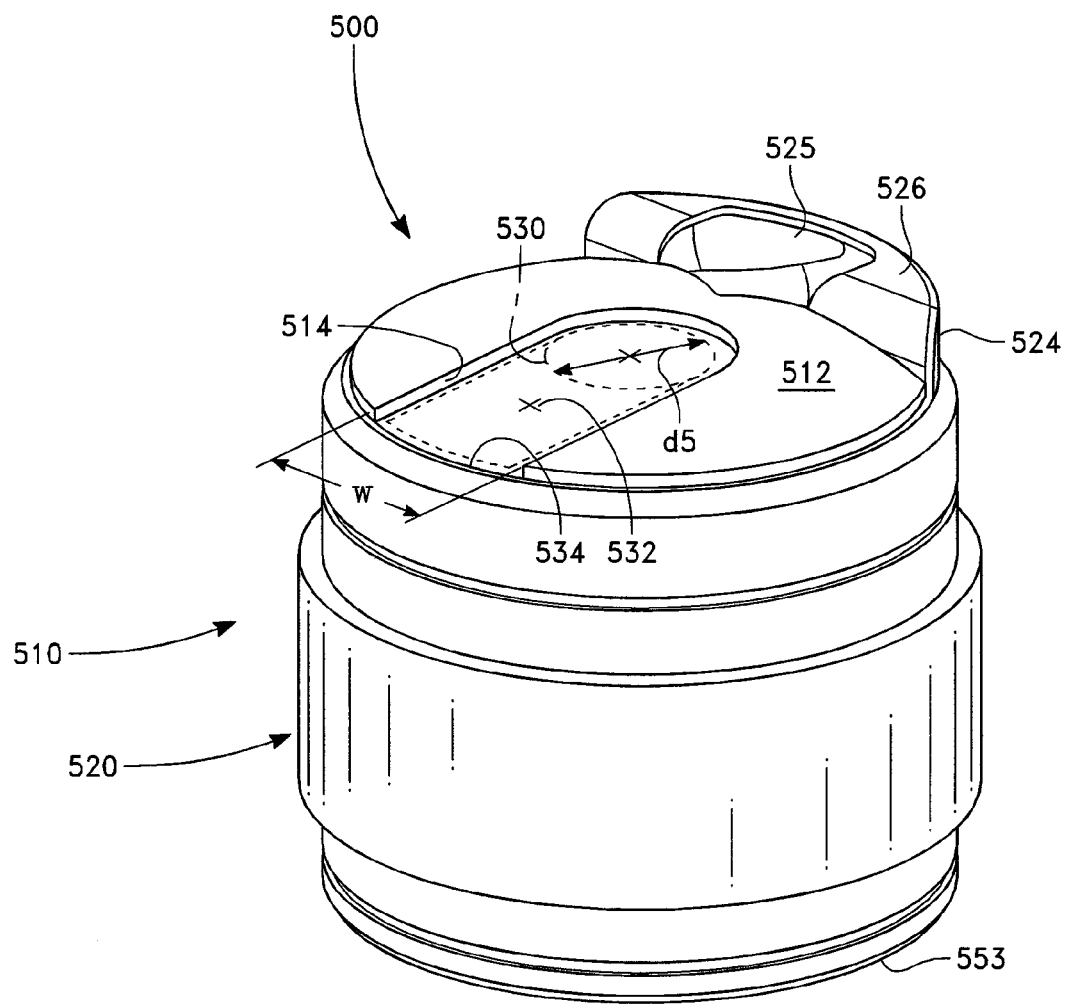
FIG. 5 is a perspective view of a third shuttle of the valve of the flow management system of FIG. 1.

FIG. 5 shows a first pump rod passing shuttle 500. The shuttle 510 includes an articulated lid 512 and a lid carrier 520. A lid boss 525 is coupled to a pivot block 526 via a pinned connection 524.

The shuttle through hole 553 is able to pass a pump rod when the articulated lid 512 is closed because of an entryway provided in the shuttle lid. In various embodiments, this entryway is a slot such as the one shown 514. The slot not only provides a pump rod entryway, it also enables the articulated lid to open as the slot is lifted away from the rod. Skilled artisans will appreciate the need for a slot that is wider "w" than the pump rod diameter "d5" to allow for freedom of movement. They will also recognize when the articulated lid is closed over the pump rod, a partial lid opening 532 remains. The partial lid opening is bounded by portions of the pump rod 530, the slot, and an adjacent portion of a lid carrier mouth 534. In various embodiments, this partial lid opening is closed wholly or partially by a flexible seal allowing pump rod passage, such as a split or a lap seal fixed to the articulated lid (not shown for clarity).

Figure 6A:
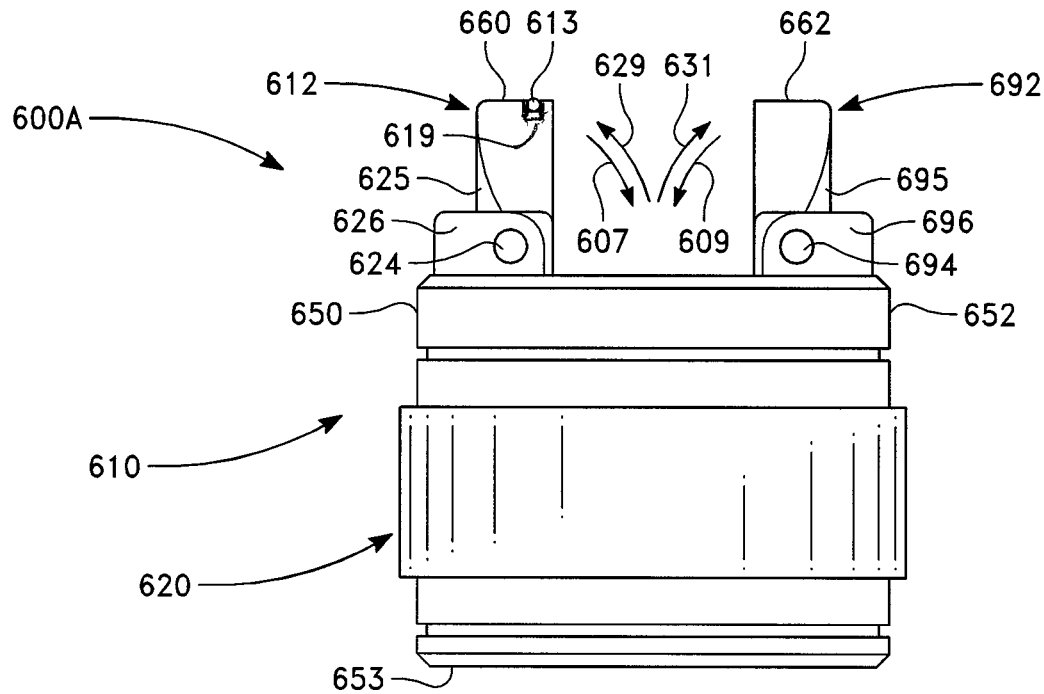
FIG. 6A is a side view of a fourth shuttle of the valve of the flow management system of FIG. 1.
Figure 6B:
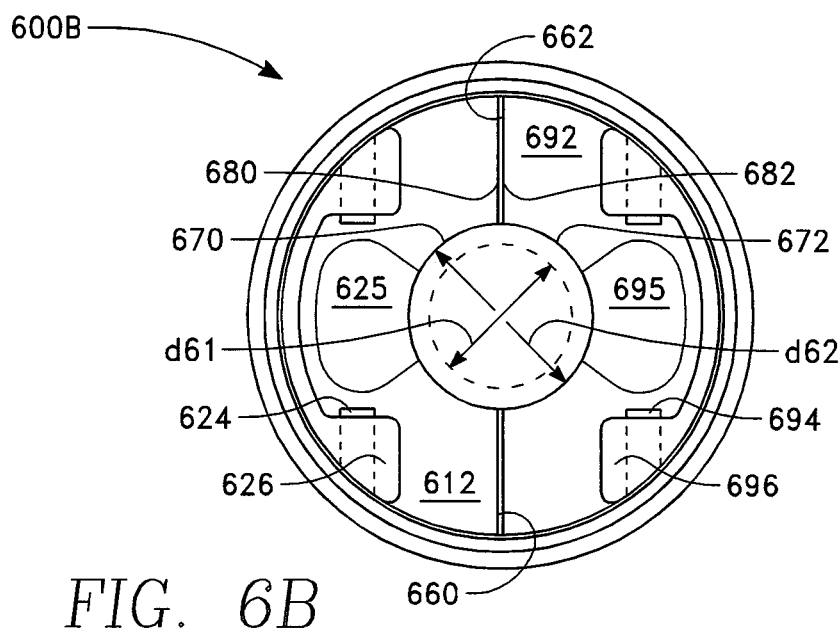
FIG. 6B is a top view of the shuttle of FIG. 6A.

FIGS. 6A and 6B show side and top views of a second rod passing shuttle 600A, 600B. This shuttle includes a multi-part lid. In particular, the shuttle 610 includes a lid carrier 620 and first and second articulated lids 612, 692.

Coupled at one side of the lid carrier 650, the first lid 612 has a first lid boss 625 which is pivotally coupled via a first pin 624 with a first pivot block of the lid carrier 626. Coupled at an opposed second side of the lid carrier 652, the second lid 692 has a second lid boss 695 which is pivotally coupled vial a second pin 694 with a second pivot block of the lid carrier 696.

The shuttle through hole 653 is able to pass a pump rod when the articulated lids are closed 612, 692 because of an entryway provided in the shuttle lids 670, 672. In various embodiments, this entryway is a somewhat semicircular hole cut from the lid's straight edge 680, 682 such that the cut outs align when the lids are closed. In some embodiments, the cut outs form a somewhat circular pump rod entryway. These cut outs not only provide a pump rod entryway, they enable the articulated lids to open as the cut-outs are lifted away from the rod. In various embodiments, a lip seal such as an elastomeric lip seal fixed to the lid parts seals between the lid and a pump rod. Skilled artisans will appreciate the need for a cut-out that forms a hole with a diameter d62 larger than the diameter of an inserted pump rod d61.

In operation, the articulated lids 612, 692 are responsive to forward and reverse flows as described above. In particular, a forward flow tends to open the lids 629, 631 allowing fluid to flow through a shuttle through hole 653 while a reverse flow tends to close the lids 607, 609.

Sealing between the front faces of the articulated lids 660, 662 may merely be a narrow gap, if any, or a seal may be employed. In some embodiments a seal is attached to one or both faces and is engaged with an opposing face when the lids are closed 607, 609. For example, a feature such as a groove 619 of a front face 660 provides a coupling for a seal. As shown, a seal 613 is located in the groove. In various embodiments, the seal is made from an elastomeric material and has a suitable cross-section such as a circular cross-section (as shown) or a rectangular cross-section.

In various embodiments the valve 300A, 300C is made from metals or alloys of metals including one or more of steel, iron, brass, aluminum, stainless steel, and suitable valve seat and closure materials known to persons of ordinary skill in the art. And, in various embodiments, one or more parts of the valve are made from non-metals. For example, valve seal parts such as closures and seats may be made from one or more suitable polymers such as PTFE (polytetrafluoroethylene), POM (Polyoxymethylene) and PEEK (PolyEtherEtherKetone). In an embodiment, one or more shuttle seals such as the seal part marked 379 are made from materials including PEEK.

As will be seen from the above, various valve embodiments react to flow conditions such as insufficient fluid flow, no fluid flow, or reverse fluid flow. For example, referring to the production string of FIG. 2 and FIGS. 3A and 3C, the valve 108, 300A, 300C and pump 104 are substantially removed from the fluid circuit when the articulated lid 312 of the shuttle 310 closes and the outlet chamber 366 is isolated from the inlet chamber 365.

A benefit of this isolation is protection of the valve and pump. For example, one protection afforded is protection from solids (such as sand), normally rising with the fluid but during insufficient flow conditions moving toward the valve and pump, that might otherwise foul or block one or both of these components. Blocking the flow path through the shuttle 353 and opening the spill ports 328 removes these solids outside the tubing string 204.

Various embodiments and applications of the valve 300A, 300C provide valve fouling/plugging protection and pump fouling/plugging/burn-out protection. For example, below design production flow rates causing valve/pump misoperation or damage in traditional production string equipment is avoided in many cases using embodiments of the valves 300A-D of the present invention.

Notably, embodiments of the bypass valves of FIGS. 3A-C and 4A-B can replace or supplement protection systems now associated with some production strings. One such protection system is the "pump-off controller" ("POC") used to protect pumps from failures due to abnormal operations such as reduced flow conditions and loss of flow conditions.

Figure 7:
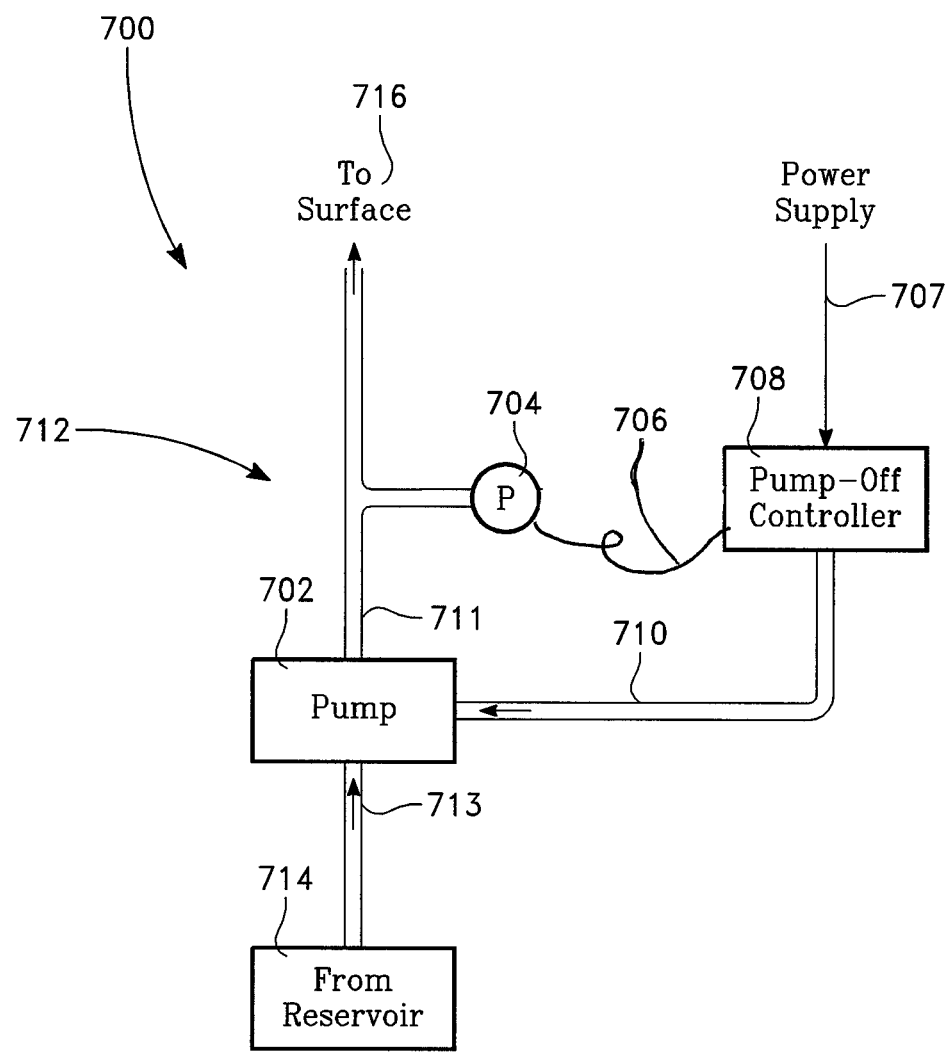
FIG. 7 is a schematic diagram of a pump-off controller implemented in a production string.

FIG. 7 shows an illustrative example in the form of a schematic diagram of a pump-off controller installation in a production string 700. A portion of the production string 712 includes a pump 702 lifting product from a reservoir 714 to a higher level such as a surface level 716. A pump-off controller 708 receives power from a power supply 707 and provides power to the pump 710 in accordance with a control algorithm. For example, a pressure indicating device 704 monitors a pressure near a pump discharge 711 and provides a signal indicative of pressure 706 to the pump-off controller. If the pump-off controller determines the indicated pressure is below a preselected low-pressure set point, the POC stops supplying power to the pump. Conditions causing low pump discharge pressure include insufficient product at the pump inlet 713 (sometimes described as a "dry suction"), pump fouling, and pump damage. Attempting to run the pump under any of these conditions has the potential to damage or further damage the pump.

Figure 8:
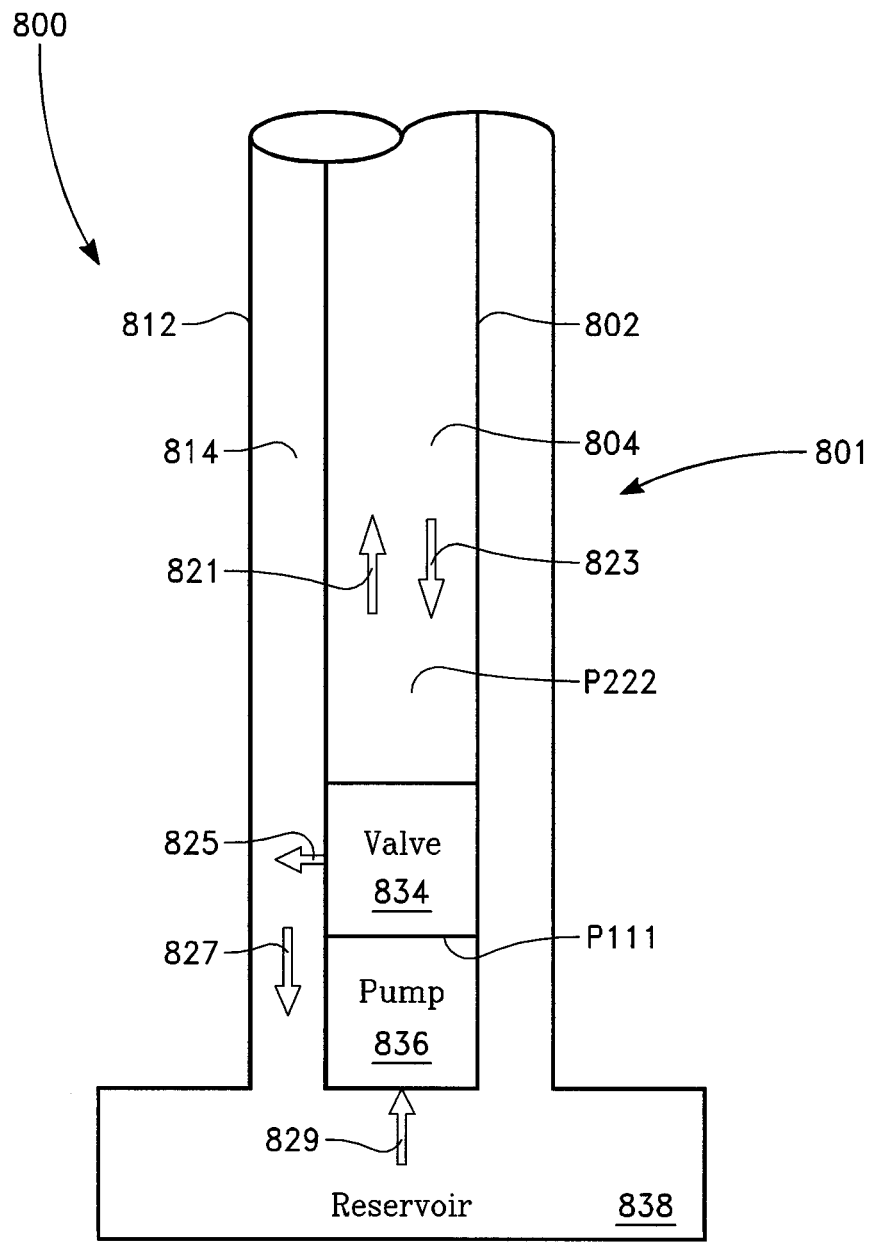
FIG. 8 is a schematic diagram of a valve of FIG. 1 used to implement a pump-off controller.

FIG. 8 shows a pump-off controller embodiment of the present invention 800. A production string 801 includes a flow management system with a pump 836 interposed between a reservoir 838 and a valve 834. Product the pump lifts from the reservoir 829 passes first through the pump and then through a bypass valve 834. The bypass valve discharges 821 into a tubing space 804 of a tubing string 802 that is surrounded by a casing 812 creating an annulus 814 between the outer casing and the inner tubing.

Figure 9:
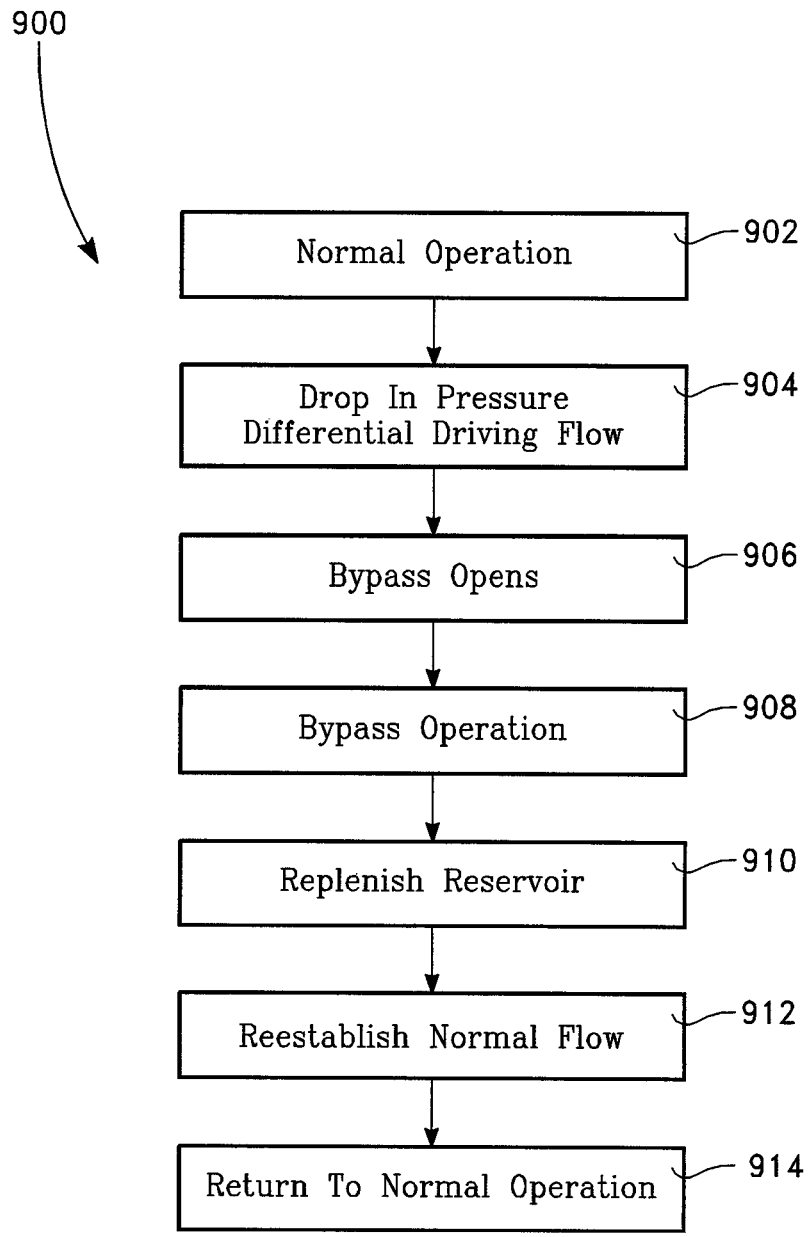
FIG. 9 is a flow chart showing a mode of operation of a valve of FIG. 1.

FIG. 9 shows a mode of bypass valve operation that substitutes for or augments a production string pump-off controller 900. For example, after a period of normal operation 902, the pressure differential (P111>P222) driving the flow in a production string 821 begins to fall 904. As explained above, low flow conditions cause the shuttle articulated lid 312 to close which blocks flow through the valve along its centerline y-y. When the forces on the shuttle including force applied by the charge spring 308 are insufficient to maintain the shuttle in a position blocking the spill port 328, the shuttle moves toward the valve inlet 398 and unblocks the spill port/opens the bypass 906. During bypass operation 908, flow through the valve along the valve centerline y-y is blocked and the spill port(s) is open, product flows from the upper tubing string 823, enters the valve outlet chamber 366, and leaves the valve through its spill port(s) 328. The spill port empties into a space such as an annulus between the tubing and the casing 814 and is returned 827 to the reservoir 838. Here, the shuttle 310 of FIGS. 3B and 3C with articulated lid 312 are exemplary of the shuttles disclosed herein including shuttles with slotted and/or multipart lids.

Because the annulus 814 is fluidly coupled to the reservoir 838 (e.g. as shown in FIG. 8), valve bypass from the spill ports is returned to the reservoir 827 in the replenishment step 910. In various embodiments, filling the reservoir with the fluid from the valve bypass serves to provide fluid to the suction of the pump 836, lift the shuttle e.g., 310, lift the shuttle articulated lid e.g., 312, and unblock flow through the valve along its centerline y-y where forward flow such as normal forward flow is re-established in step 912. Re-establishment of normal flow is followed by a return to normal operation in step 914.

The pump-off control steps of FIG. 9 result, in various embodiments, in cyclic flows through the pump. The time between these cyclic flows is shorter than would occur with a traditional valve in a traditional production string configuration because such strings are unable to bypass flow to the reservoir.

As persons of ordinary skill in the art will appreciate, many production string pumps rely on the pumped product as pump lubrication and coolant. Therefore, reducing the duration of dry pumping periods reduces pump damage due to operation with insufficient lubricant and coolant. The benefits include one or more of longer pump life, fewer outages, and higher production from tight reservoirs.

The present invention has been disclosed in the form of exemplary embodiments; however, it should not be limited to these embodiments. Rather, the present invention should be limited only by the claims which follow where the terms of the claims are given the meaning a person of ordinary skill in the art would find them to have.

What is claimed is:

1. A valve for use in a flow management system comprising:
   the valve for location in a hydrocarbon production string between a hydrocarbon reservoir pump and production tubing for surfacing produced hydrocarbons:
   a valve body with a spill port, the valve body having a valve body centerline extending between opposed ends of the valve;
   a shuttle enclosed by the valve body, the shuttle including a lid carrier and a lid;
   the lid carrier having a lid end and the lid rotatably coupled to the lid carrier near the lid end;
   the lid carrier located in a chamber of the valve body;
   the lid carrier having a through hole extending between a lid carrier spring end and the lid carrier lid end;
   upper and lower lid carrier mouths bounding the lid carrier through hole;
   a first seal between the upper lid carrier mouth and the lid;
   a second seal between the upper lid carrier mouth and the valve body;
   a spring for urging the shuttle to move toward the spill port; and,
   the valve operable to pass a flow entering the through hole at the lid carrier spring end and to spill a flow that closes the lid against the lid carrier.

2. The valve of claim 1 further comprising:
   a lid seat located in the upper lid carrier mouth for mating with the lid and forming the first seal therebetween.

3. The valve of claim 2 further comprising:
   a valve body seat; and,
   the valve body seat and a valve body seat closure located at the upper lid carrier mouth for forming a second seal therebetween.

4. The valve of claim 3 further comprising:
   a lid carrier peripheral sealing surface and a valve bore for forming a third seal therebetween.

5. The valve of claim 3 wherein the valve body seat closure is not inside the lid carrier.

6. The valve of claim 3 wherein the valve body seat closure is radially oriented with respect to the valve body centerline.

7. The valve of claim 1 wherein the spring is compressed when the shuttle moves toward a spring base as a result of the lid blocking the lid carrier through hole.

8. The valve of claim 7 wherein the spring expands when the shuttle moves away from the spring base as a result of the lid moving away from the lid carrier through hole.

9. The valve of claim 8 wherein when the valve is in use, the spill port is blocked after the lid opens to pass a forward flow entering the lid carrier through hole at the lid carrier spring end.

10. The valve of claim 9 wherein when the valve is in use, the spill port is not blocked after the lid closes to spill a reverse flow that does not enter the lid carrier through hole at the lid carrier spring end.

11. The valve of claim 8 wherein the spill port is blocked when the spring is expanded at the end of a spring expansion stroke.

12. The valve of claim 11 wherein the spill port is not blocked when the spring is compressed at the end of a spring compression stroke.

13. The valve of claim 1 wherein a spill port centerline is perpendicular to the valve body centerline.

14. The valve of claim 1 wherein the lid is radially oriented with respect to the valve body centerline.

15. The valve of claim 1 further comprising a seat adjacent to the spill port for engaging the lid carrier.

16. The valve of claim 1 wherein a flow that is sufficient to move the lid away from the lid carrier tends to balance forces acting on the shuttle such that the spring has a first spring length and wherein a flow that is not sufficient to move the lid away from the lid carrier tends to balance forces acting on the shuttle such that the spring has a second spring length less than the first spring length.

17. The valve of claim 16 wherein flows sufficient to move the lid away from the lid carrier are forward flows that pass between opposed ends of the valve body and enter the valve body at the valve end nearest a spring base.

18. The valve of claim 1 wherein a valve operating response to the lid sealingly engaging the lid carrier is compression of the spring and opening of the spill port.

19. The valve of claim 1 wherein an inlet of the spill port is located between two seals.

20. The valve of claim 1 wherein the spring tends to close the spill port.

21. The valve of claim 1 wherein the lid is configured with a slot to accommodate a pump drive rod passing therethrough.

22. The valve of claim 21 further comprising a seal fixed to the lid and configured to be lifted free of the rod during valve operation, the seal for sealing at least a portion of the slot.

23. The valve of claim 1 wherein the lid includes two separately articulated portions.

24. The valve of claim 23 wherein the articulated lid portions provide a passageway for a pump rod when they are closed against the lid carrier.

25. The valve of claim 24 wherein seals fixed to respective articulated lid portions seal at least a portion of the passageway.

26. The valve of claim 1 wherein the shuttle through hole is characterized by a smooth bore.

27. The valve of claim 1 wherein the lid carrier moves within a monolithic portion of the valve body.

28. The valve of claim 1 wherein the spring is a coil spring located between the shuttle and a valve end that serves as a valve throuqhflow inlet.

29. The valve of claim 1 wherein the valve body lid carrier chamber is located between opposed ends of the valve body.

30. A method of protecting a pump comprising the steps of:
   providing a fluid to be lifted from a fluid reservoir and a pump for lifting the fluid;
   providing a valve downstream of the pump, the valve including
      a valve body with a spill port,
      a shuttle located in a chamber of the valve body,
      the shuttle having a centrally located through hole extending between an upper end and a lower end,
      shuttle upper end and shuttle lower end mouths bounding the shuttle through hole,
      a first seal between the shuttle upper end mouth and a lid, and
      a second seal between the shuttle upper end mouth and the valve body;

the lid rotatable affixed at the shuttle upper end,
a valve center line shared by the valve body and the shuttle,
passing a flow entering the through hole at the shuttle spring end; and,
spilling a flow when the lid blocks the shuttle through hole, the spilled flow returned to the fluid reservoir.

31. The method of claim 30 wherein the through hole and the shuttle share a common, single longitudinal axis.

32. The method of claim 30 wherein a coil spring is located between the shuttle lower end and a valve throuqh-flow inlet.

33. An oil production method utilizing a valve in a flow management system for producing the oil, the method comprising the steps of:
providing a valve body with a spill port, the valve body having a valve body centerline extending between opposed ends of the valve;
positioning a shuttle in a chamber within the valve body, the shuttle including a lid carrier and a lid;
rotatably coupling the lid to a lid end of the lid carrier;
extending a through hole centered on the valve body centerline between a lid carrier spring end and a lid carrier lid end;
providing lid carrier lid end and lid carrier spring end mouths bounding the shuttle through hole, a first seal between the lid carrier lid mouth and the lid, and a second seal between the lid carrier lid end mouth and the valve body;
with a spring, urging the shuttle to move toward the spill port;
passing a flow entering the through hole at the lid carrier spring end when the valve surfaces oil; and,
spilling a flow when the flow enters the valve and causes the lid to close against the lid carrier.

34. The method of claim 33 further comprising the steps of:
locating the valve in a production string between a pump and production tubing for surfacing oil; and,
surfacing oil when the pump runs and the spring is compressed by fluid forces including fluid forces acting on the lid carrier.

* * * * *